June 9, 1959  D. D. HOOGESTRAAT  2,890,005
PORTABLE WIRE REEL
Filed July 17, 1956
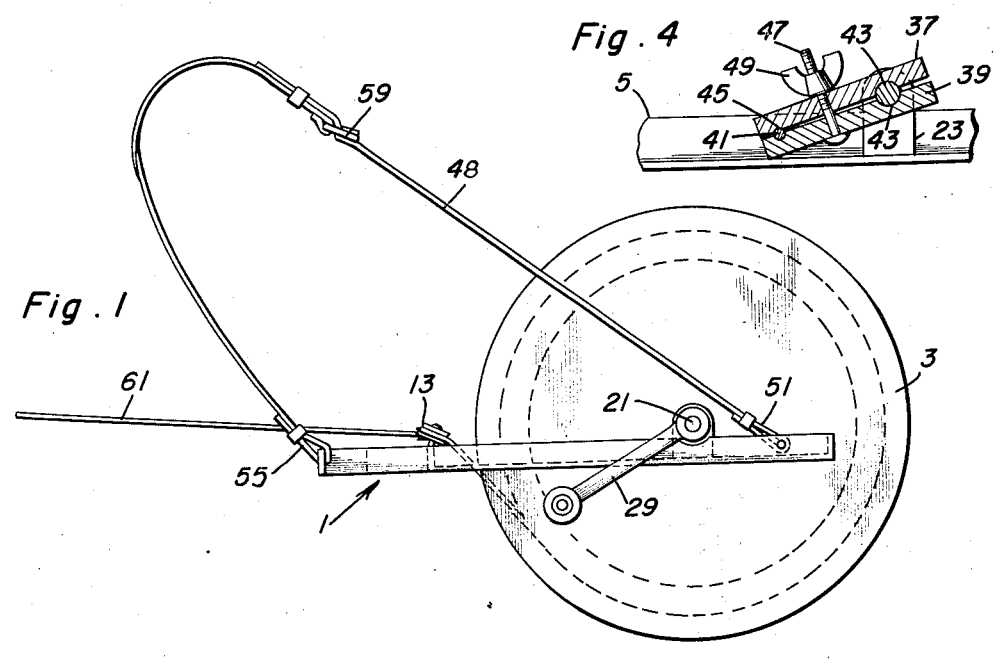
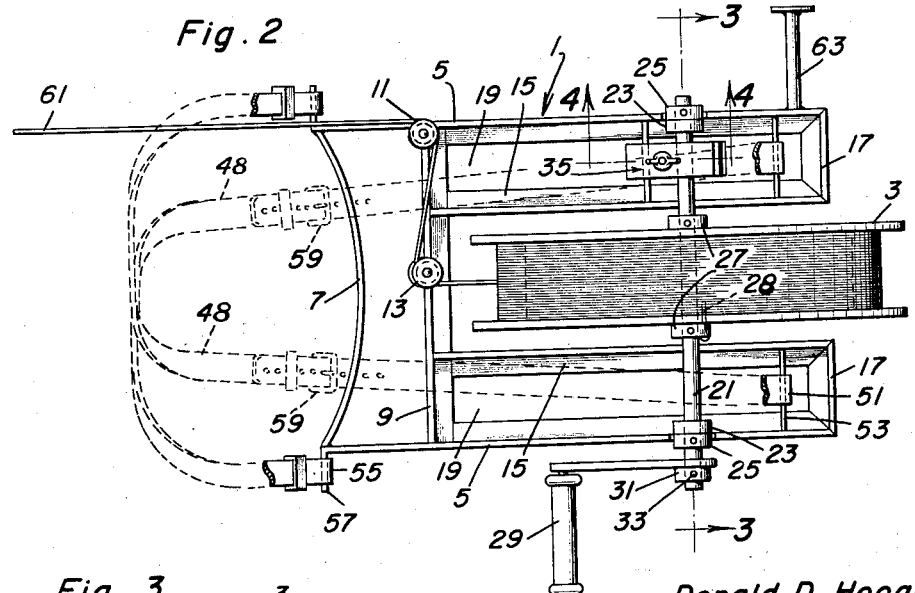
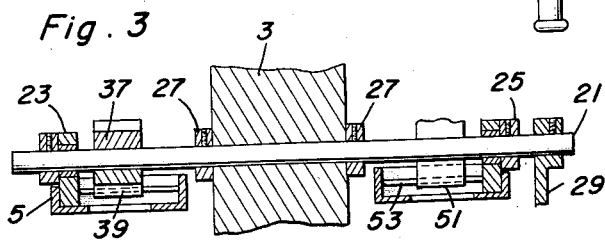
Donald D. Hoogestraat
INVENTOR.

United States Patent Office 2,890,005
Patented June 9, 1959

2,890,005
PORTABLE WIRE REEL
Donald D. Hoogestraat, Lennox, S. Dak.
Application July 17, 1956, Serial No. 598,406
2 Claims. (Cl. 242—96)

My invention relates to improvements in portable wire reels for winding up and unwinding electric fence wire in a field or the like.

The primary object of my invention is to provide a strongly constructed, lightweight device for carrying by a person in front of the same substantially waist high and horizontally with the weight comfortably carried on the shoulders, and which embodies a comparatively large crank-operated spool for winding up and unwinding wire, and a simple form of friction brake for preventing backlash of the reel during unwinding of wire.

These together with other objects and advantages which become subsequently apparent reside in the details of construction and operation as more fully hereinafter described and claimed, reference being had to the accompanying drawing forming a part hereof, wherein like numerals refer to like parts throughout, and in which:

Figure 1 is a view in side elevation of my improved reel in a preferred embodiment thereof;

Figure 2 is a view in plan with parts shown in broken lines;

Figure 3 is an enlarged fragmentary view in vertical transverse section taken on the line 3—3 of Figure 2; and Figure 4 is an enlarged fragmentary view in longitudinal vertical section taken on the line 4—4 of Figure 2.

Referring to the drawing by numerals, the reel of my invention comprises a substantially rectangular frame, designated generally by the numeral 1, for carrying substantially horizontal in front of a person to support in vertical position a wire winding and unwinding spool 3.

The frame 1 comprises a pair of longitudinal side bars 5, a transverse rear waist bar 7 cross connecting said bars 5 at rear ends thereof and bowed inwardly of the frame 1 to comfortably fit against the abdomen of the person, a rear crossbar 9 spaced forwardly of the waist bar 7 and for supporting wire guiding pulleys 11, 13, presently again referred to, and a pair of longitudinal bars 15 extending forwardly from the crossbar 9 and which are spaced laterally from the side bars 5 and connected at front ends thereof to front ends of the side bars 5 by crossbars 17 for forming rectangular, horizontal reinforcing loops 19 on opposite sides of the frame 1 spaced apart so that the frame 1 is bifurcated forwardly of the crossbar 9 to accommodate the spool 3 therein to extend forwardly out of the frame.

The spool 3 is carried by a shaft 21 extending transversely of said frame, slightly above the same, and having its ends journaled in bushed bearing blocks 23 rising from the side bars 5. Set collars 25 on the outer ends of the shaft 21 prevent end play of said shaft. Set collars 27 on the shaft 21 at opposite sides of the spool 3 center said spool in the longitudinal center of the frame. A prong 28 on one of the set collars 27 keys the spool 3 to the shaft 21 for rotation thereby. A hand crank 29 is fixed by a hub 31 and screw 33 on the right-hand end of the shaft 21 for rotating said shaft and spool.

A friction brake 35 for the shaft 21 is provided in one of the loops 19 and comprises a pair of elongated upper and lower, flat brake shoes 37, 39 which at one end straddle the shaft 21 and at their opposite ends straddle a transverse pivot pin 41 in said one loop 19 and suitably fixed to the side bar 5 and longitudinal bar 15 forming said loop. The shoes 37, 39 are provided with opposite notches 43 seating the shaft 21 and with smaller opposite notches 45 seating the pin 41.

The brake shoes 37, 39 are spaced apart and pivot on said pin 41 for clamping the shaft 21 with variable pressure. A bolt 47 extends transversely and centrally through said shoes 37, 39 and is provided with a wing nut 49 for drawing said shoes together into clamping relation to the shaft 21 and pin 41.

A pair of shoulder straps 48 are provided for carrying the frame 1. The shoulder straps 48 are suitably connected at front ends thereof, as at 51, to cross pins 53 in the loops 19 at the front of the frame and forwardly of the shaft 21 and are suitably connected at rear ends thereof, as at 55, to lateral terminal lugs 57 on the side bars 5 at the waist bar 7. Buckles 59 in the shoulder straps 48 provide for adjusting said straps and said straps 48 are crossed to extend rearwardly diagonally across the back of a person from one side of the frame 1 over the shoulder at the opposite side of the person.

The pulley 11 is mounted substantially horizontally at the left side of the frame 1 to project outwardly thereof to guide wire, as at 61 in unwinding, rearwardly, at one side of a person and from the pulley 13 which is mounted on the crossbar 9 in the plane of the spool 3 to guide the wire from said spool. Preferably, the pulleys 11, 13 are both mounted in spaced relation on the bar 9.

A headed handle 63 extends laterally from the front of the frame at the left side thereof for grasping by the hand of the person carrying the frame 1 to hold said frame down and stabilize the same and for manipulating the frame for level winding of wire on the spool 3.

In winding up wire, the wire is suitably attached to the spool 3 from the front thereof, the brake 35 is adjusted, by loosening the bolt 47, to free the shaft 21, the person carrying the device grasps the handle 63 by the left hand for the purpose set forth and operates the crank 29 with the right hand to wind up the wire on the spool as he walks forwardly.

In unwinding the wire, it is trained from the spool 3 around the pulley 13 and thence around the pulley 11 to extend rearwardly at one side of the person and the frame 1 as the device is carried forwardly, or held stationary. In unwinding operations, the brake 35 is adjusted in the manner which will now be clear to apply a desired braking pressure to the shaft 21 sufficient to prevent backlash of the spool 3.

The frame 1 may be inexpensively formed of stock metal bars.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A portable reel for winding up and unwinding wire in a field comprising a rectangular frame adapted to be carried horizontally by a person in front thereof, said frame comprising longitudinal side bars, a rear bar cross connecting the side bars and curved to fit across the abdomen of a person, a rear brace bar extending between said side bars forwardly of said rear cross bar, and a pair of longitudinal bars between said side bars extending forwardly from said rear brace bar and connected to said side bars to form a pair of reinforcing side loops in said frame spaced apart, a shaft extending across said frame forwardly of said rear brace bar and having ends journaled on said side bars, a spool keyed to said shaft between said pair of loops and extending out of the space between said loops, a crank on one end of said shaft for rotating the same to rotate the spool for winding wire thereon, and a pair of shoulder straps for supporting the frame on a person having front ends connected to the frame within said loops forwardly of said shaft and rear ends connected to the side bars adjacent said rear cross bar.

2. A portable reel as in claim 1, and a friction brake in one of said loops for braking said shaft to prevent backlash of the reel in unwinding wire.

References Cited in the file of this patent

UNITED STATES PATENTS

| 417,793 | Richards | Dec. 24, 1889 |
| 2,717,129 | McDonald | Sept. 6, 1955 |

FOREIGN PATENTS

| 16,692 | Great Britain | June 8, 1916 |